(12) United States Patent
Frantz

(10) Patent No.: US 6,940,425 B2
(45) Date of Patent: *Sep. 6, 2005

(54) APPARATUS AND METHOD FOR DETERMINING INFORMATION FOR AIRCRAFT

(76) Inventor: James B. Frantz, 950 Iris Cir., Excelsior, MN (US) 55331

( * ) Notice: Subject to any disclaimer, the term of this patent is extended or adjusted under 35 U.S.C. 154(b) by 331 days.

This patent is subject to a terminal disclaimer.

(21) Appl. No.: 09/861,699

(22) Filed: May 21, 2001

(65) Prior Publication Data

US 2001/0028315 A1 Oct. 11, 2001

Related U.S. Application Data

(63) Continuation-in-part of application No. 09/201,067, filed on Nov. 30, 1998, now Pat. No. 6,271,769.
(60) Provisional application No. 60/067,147, filed on Dec. 2, 1997.

(51) Int. Cl.[7] .............................................. G08B 23/00
(52) U.S. Cl. .......................... 340/963; 340/969; 73/180
(58) Field of Search ................................. 340/963, 969, 340/967, 966, 974, 975; 730/180, 182, 170.14; 244/181

(56) References Cited

U.S. PATENT DOCUMENTS

| | | | | |
|---|---|---|---|---|
| 4,350,314 A | * | 9/1982 | Hoadley | 244/1 R |
| 4,378,696 A | * | 4/1983 | DeLeo et al. | 73/180 |
| 4,909,077 A | * | 3/1990 | Greene | 73/180 |
| 5,205,169 A | * | 4/1993 | Hagen | 730/180 |
| 5,349,347 A | * | 9/1994 | Muller | 340/969 |
| 6,271,769 B1 | * | 8/2001 | Frantz | 340/963 |

* cited by examiner

*Primary Examiner*—John Tweel
(74) *Attorney, Agent, or Firm*—Dorsey & Whitney LLP

(57) ABSTRACT

The present invention provides a method for determining information for an air vehicle including the steps of providing a first coefficient of pressure data point, providing a situation involving the air vehicle, deriving pressures during the situation and deriving a second coefficient of pressure data point from the pressures derived during the situation, and defining a line passing through the first and second coefficient of pressure data points, whereby a selected coefficient of pressure data point on the line corresponds to the information. The invention encompasses apparatus for accomplishing the method. In some embodiments, the information relates to angles from zero lift and/or zero yaw.

27 Claims, 9 Drawing Sheets

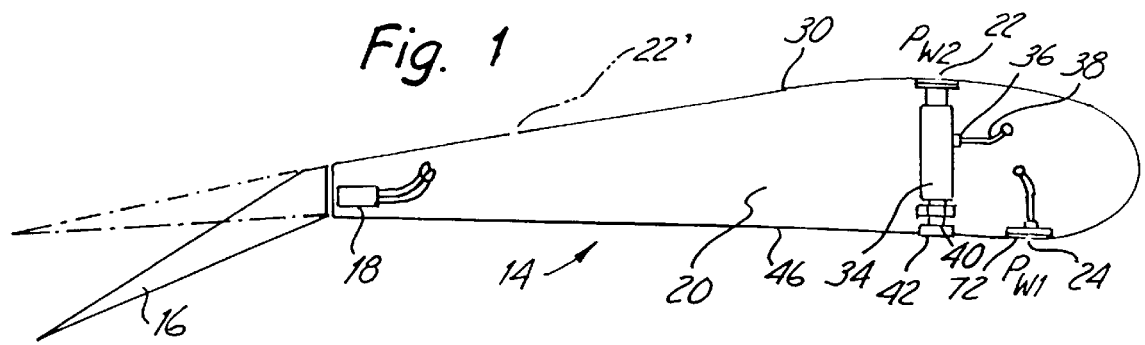
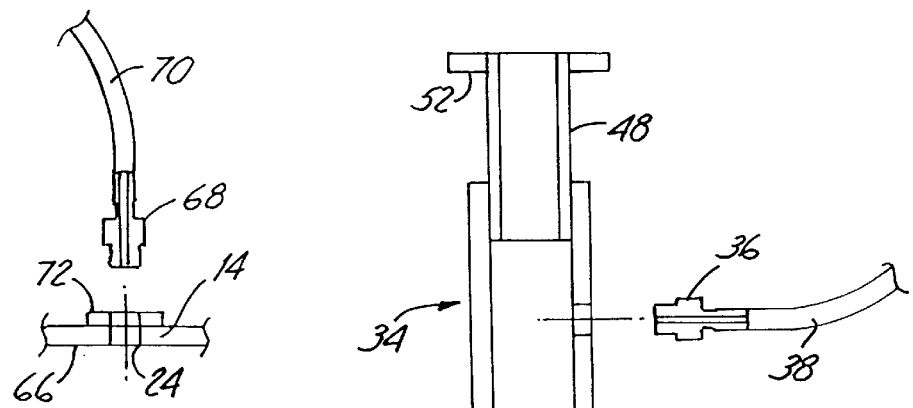

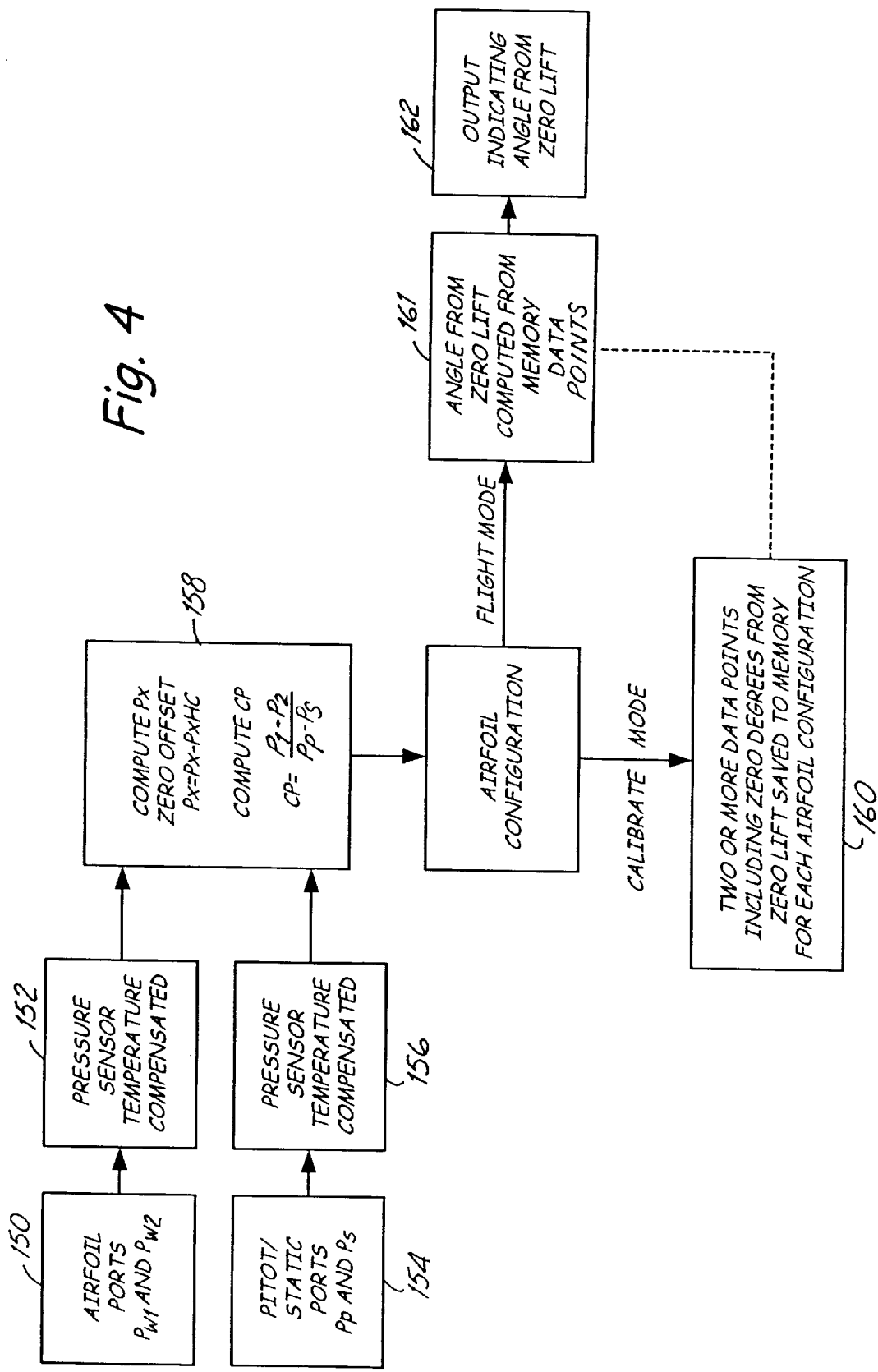

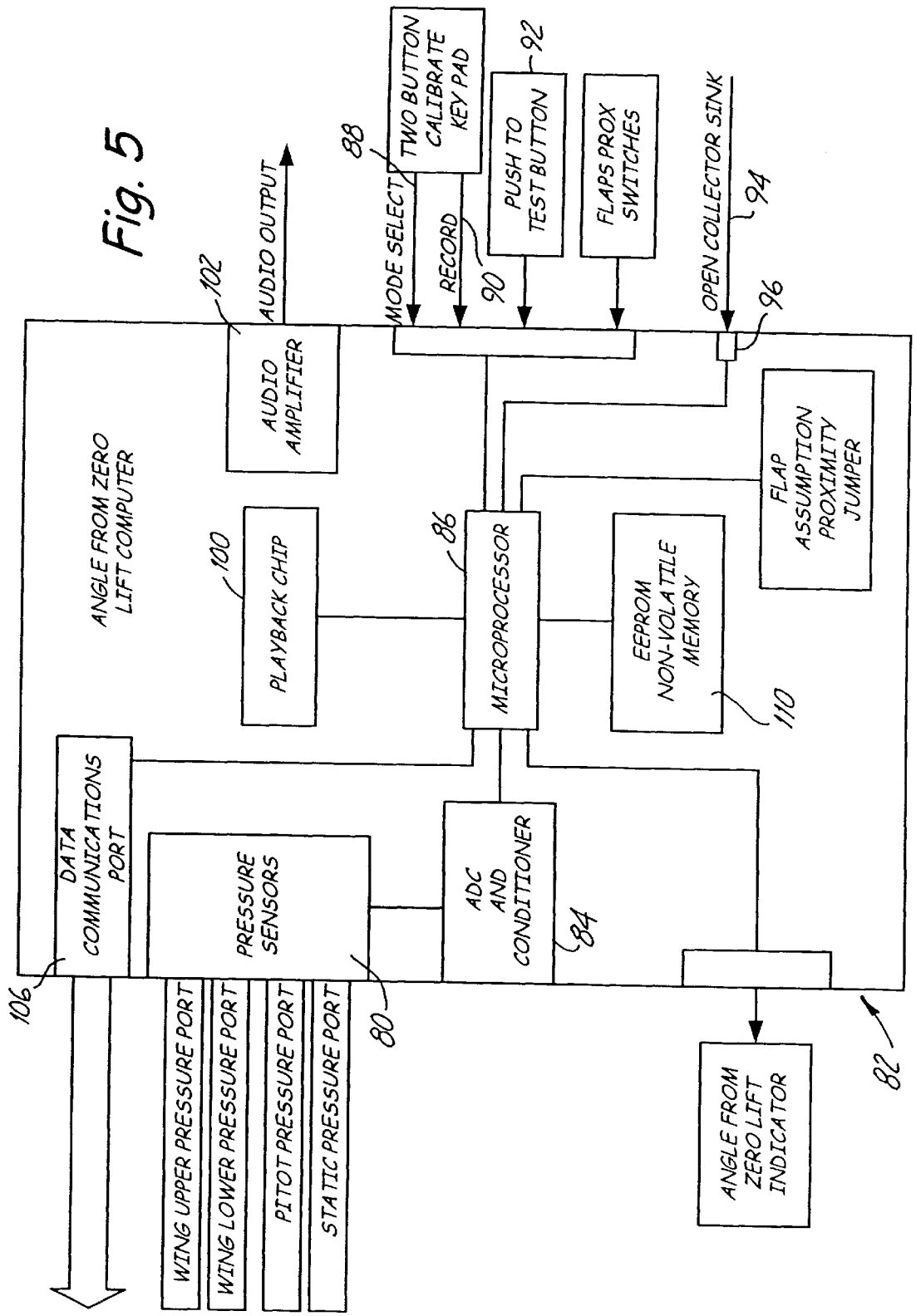

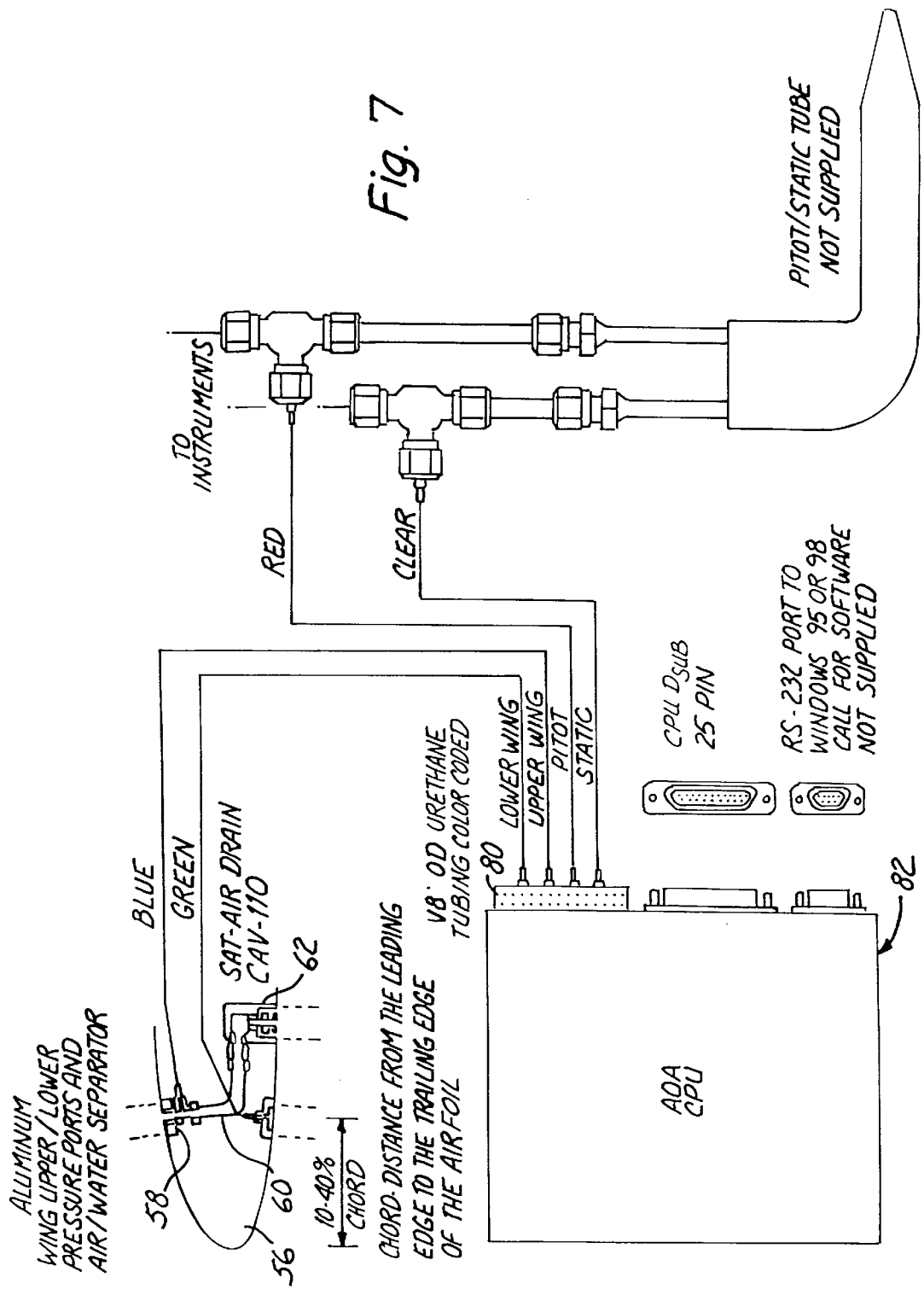

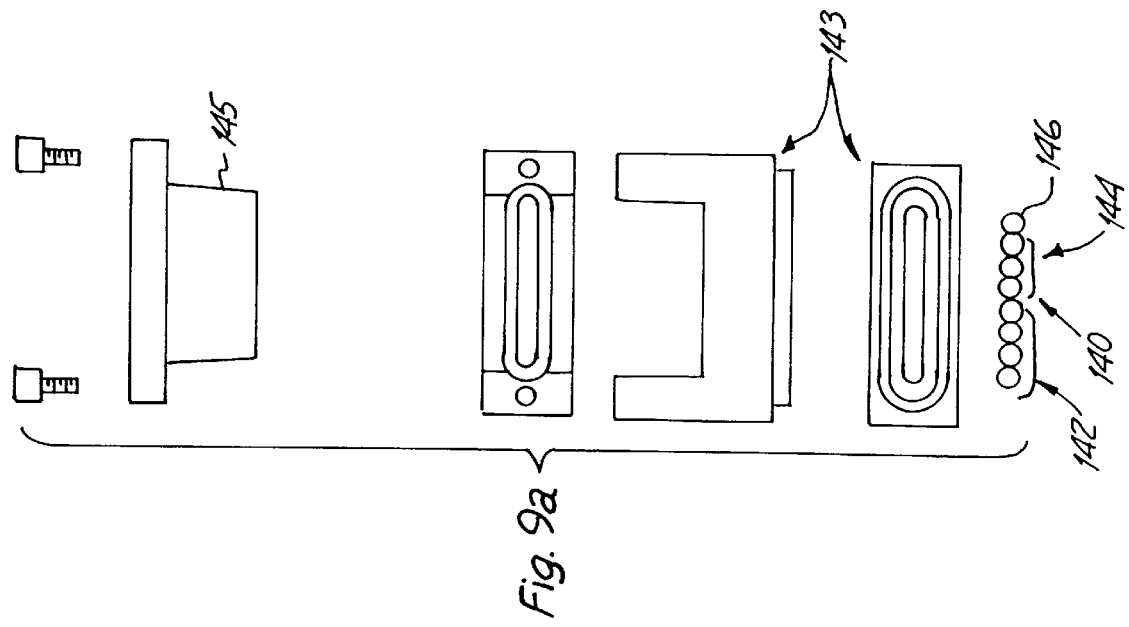
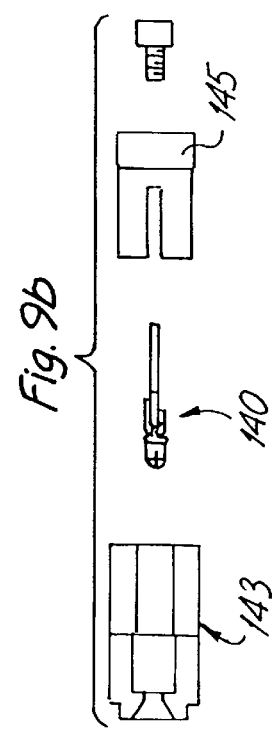

APPARATUS AND METHOD FOR DETERMINING INFORMATION FOR AIRCRAFT

The present application claims priority of a U.S. provisional patent application, Ser. No. 60/067,147, filed Dec. 2, 1997, and a continuation-in-part of U.S. non-provisional patent application, Ser. No. 09/201,067, filed Nov. 30, 1998, issued Aug. 7, 2001 as U.S. Pat. No. 6,271,769.

BACKGROUND OF THE INVENTION

The present invention relates to flight instrumentation for aircraft. More particularly, it relates to a measurement, data manipulation and information display system and method for use on air vehicles, wherein the system includes pressure sensors, a data processor, at least one data port for electrically exporting angles from zero lift, and an indicator for communicating information relating to angles from zero lift.

Past and present pressure type angle of attack devices use a variety of differently shaped probes. A hemispherical end sensor is described in U.S. Pat. No. 3,318,146. Angle of attack (AOA) and angle of side slip both are calculated from the pressure signals present at five ports on the end. This angle of attack measuring device requires use of the probe as described and the probe must be installed at a very precise angle relative to the cord of the wing or some other longitudinal plane of the air machine.

Sharp tipped pitot static tubes with angle of attack sensing ports are shown in U.S. Pat. Nos. 4,096,744 and 4,378,696. These patents show probes providing differential pressures which are used for determining angle of attack. In the '696 patent, a combination of differential pressure at two ports on the probe, measured pitot and static pressure is used. In the '744 patent, measured pitot pressure, pressure at one of the angle of attack sensitive ports and measured impact pressure are utilized for the calculations.

U.S. Pat. No. 5,616,861 discloses a plurality of air sensing probes symmetrically mounted on opposite sides of a vertical center plane of the air vehicle which includes the longitudinal axis of the air vehicle.

In each of the above instances, the angle of attack systems require special probes usually installed at very precise angles relative to the cord of the airfoil, each other, or other longitudinal axis of the air vehicle.

Additionally, in the above instances and other known sensor systems, the probes must be located well ahead of the wing to reduce the effect of changes in lift and configuration. Usually the probe is located on or near the nose of an aircraft. This is a problem since many factors can affect the relationship between the local AOA and the true wing AOA. The airflow around the nose is not the same as that at the wing. Pitch rate errors occur when the nose of an aircraft is pitched up or down causing the probe to indicate too high or too low. In a turn, for example, the nose is pitched up reducing the local flow angle and causing the AOA reading to be too low. Because of the shape of the nose, sensitivity errors are introduced. A one degree change in true wing AOA may cause the local flow angle at the nose to be 1.5 to 2 degrees.

Another problem with systems such as those noted above is that the measurement used was based on angle of attack which is the angle between the cord of the airfoil and the relative wind. The above patented devices are representative of the many devices that have been invented and installed on aircraft to produce a known pressure differential at a known angle of attack. Typically, they require that a probe or probes be installed at a fixed angle relative to a known plane of the air vehicle, usually the cord or surface of the wing or longitudinal axis of the air vehicle.

In recent years, there has been emphasis on making pressure sensing probes compact, light and with low drag as illustrated by the devices shown in U.S. Pat. Nos. 4,836,019, 5,616,861 and 5,331,849. However, there is still room for improvement.

U.S. Pat. No. 4,350,314 describes a stall condition detector that uses four pressure ports in the wing which are ported to a capacitance device within the wing. The detector involves four electrically conductive hollow tubes with rods extending up through the tubes. The tubes are filled with a dielectric fluid. Devices of this type may be subject to errors induced by temperature and other forces acting upon the dielectric fluids resulting from turbulence, G loads, slips and skids. Additionally, with the emphasis of higher loaded airfoils, the newer airfoil designs are smaller and thinner, thus having smaller interior compartments, making these devices difficult to install. In addition, the angle of attack display of this type of device does not take into account high lift devices which may significantly reconfigure the shape of the airfoil.

An aircraft instrument system for communicating accurate information involving angles from zero lift, wherein the information may be derived from simple pressure ports rather than known probes or detectors of the type disclosed in the '314 patent, would be advantageous.

SUMMARY OF THE INVENTION

The present invention relates to a measurement and display system for use on air vehicles having an indicator visibly displaying angles from zero lift and having a data port for electrically exporting angles from zero lift. In one embodiment, pressures from upper and lower wing ports and pressures from the typical pitot and static ports of an air vehicle are converted to digital data and mathematically divided one into the other. The result is a coefficient of pressure (CP) which varies uniquely with angles from zero lift of the air vehicle. The angular deviation from angle of zero lift display is designed for air vehicles and is located in the cockpit and displays angles from zero lift on a digital display. The data port electrically exports angles from zero lift to other electronic devices using a compatible communications port. It has been discovered that if the coefficient of pressure data point for zero degrees angular deviation from angle of zero lift and a minimum of one other coefficient of pressure data point is stored permanently in the system's non-volatile memory, other angles from zero lift can be determined given any coefficient of pressure. For any given airfoil it has been discovered that a minimum of two or more coefficient of pressures will accurately define the relationship between the coefficient of pressure and the angular deviation from angle of zero lift. Once the data points are stored in the system's non-volatile memory, all other coefficient of pressures can be equated to a specific angular deviation from angle of zero lift. Thus, in one embodiment, the present invention provides an apparatus and method for measuring pressures, for deriving and storing in non-volatile memory two or more coefficient of pressure data points, and for exporting and displaying the angles from zero lift.

An advantage of the present invention is that a microprocessor may be used to permanently store the two or more coefficient of pressures which may be copied and installed in the angular deviation from angle of zero lift system of similar air vehicles of the same type to accurately display angles from zero lift.

The instrument of the present invention could also measure angle-of attack (AOA) which is the angle between the relative wind and the chord of the airfoil. But the zero reference for AOA is of no value to the pilot and has no aerodynamic significance. In the case of measuring angles from zero lift, the reference zero angle from zero lift is the angle where the air vehicle creates no lift and therefor is the only angle where the induced drag is zero. For symmetrical airfoils, AOA and angles from zero lift are the same. For a nonsymmetrical airfoil, AOA and angles from zero lift vary by a fixed constant.

The present invention provides an apparatus and method for use on aircraft and includes pressure sensors, a processor, at least one data port for electrically exporting angles from zero lift, and an indicator for visibly displaying angles from zero lift. The present invention provides the apparatus and method for measuring angular deviation from angle of zero lift using pressures from pressure sensing ports, assembled with pressure sensors that minimize the need for temperature compensation and a processor that computes angular deviation from angle of zero lift using two or more flight data points permanently recorded into non-volatile memory for a variety of airfoil configurations. In one embodiment, upper and lower airfoil pressure ports ported to an angular deviation from angle of zero lift processor may be simply a small hole or holes bussed together in the upper surfaces of the wing and/or a small hole or holes bussed together in the lower surfaces of the wing and connected to tubes routed to the processor. In this embodiment, there would be no need for probes such as those described in the above-noted patents. For example, the pressure ports for the pitot and static pressures may be from a pitot/static tube or individual pitot and static ports of the type described in the above-noted patents, or may be from the air vehicles airspeed pressure tubes, eliminating the need for a separate pitot static probe.

It will be noted that the existence and use of pressure sensors integrated on silicone, which are generally trouble free, make the device according to the present invention particularly advantageous. In the case where known type probes are too heavy or expensive, it is nevertheless possible to use a pressure port in the top of the airfoil with a water separator and, optionally, a pressure port in the bottom of the airfoil to provide upper and lower wing local pressures.

In the case of using upper and lower local wing pressures, in one embodiment, the wing pressures can be ported to a single differential pressure transducer. The pitot and static pressures can be ported to a single differential pressure transducer. No matter where the source of the wing local differential pressure is, the result of dividing the wing local differential pressure by the pitot/static differential pressure (dynamic pressure) provides a coefficient of pressure (CP) which varies uniquely with angles from zero lift for the air vehicle.

It should be appreciated that, in the case of using either an upper or lower pressure port or ports bussed together, the wing port/ports can be ported to a single absolute pressure sensor, the pitiot pressure can be ported to a single absolute pressure transducer, and the static pressure can be ported to a single absolute pressure transducer. The result of computing the difference between the wing pressure and the static pressure and dividing by the difference between the pitot pressure and the static pressure is a coefficient of pressure which varies uniquely with angles from zero lift for the air vehicle.

The angle from zero lift processor converts the three or four ported pressures to an analog output using temperature compensated solid state pressure transducers. An analog to digital converter may be used to convert the analog data to digital data. The digital pressure data may be processed by a microprocessor which computes a coefficient of pressure. The coefficient of pressure may be used to calculate the angular deviation from angle of zero lift using a known relationship between the coefficient of pressure and the angular deviation from angle of zero lift.

The relationship between the coefficient of pressure and the angle from zero lift is determined by using two or more data points saved in the non-volatile memory of the angle from zero lift computer. These permanently saved calibration points may be derived by flying the air vehicle into two or more flight maneuvers. A zero G maneuver that determines the coefficient of pressure where the angular deviation from angle of zero lift is zero degrees is saved to non-volatile memory. A higher angle or angles from zero lift are flown and saved to non-volatile memory. In the case of two data points, these points mathematically determine points along an assumed relationship (linear and/or curvilinear) between the coefficient of pressure and angles from zero lift. In the case of more than two data points, these points mathematically determine points along the assumed smoothed line relationship between the coefficient of pressure and angles from zero lift.

The angles from zero lift are displayed on a angle from zero lift display instrument and angles from zero lift are exported via a data port generally compatible with flight data computers. When the angular deviation from angle of zero lift approaches a critical angle, such as the angle at which airflow will separate from the airfoil, the system exports electrical, aural and/or visual warnings via the data port and the visual display or audio system.

An advantage of the present invention is that it does not require the precise installation of any device or probe that produces a known pressure at a known angle of attack thereby eliminating all installation calibrating efforts and errors. The present invention uses a zero G flight maneuver to determine when the airfoil is producing no lift and records the coefficient of pressure in non-volatile memory of a suitable computer or microprocessor. The zero G maneuver determines the coefficient of pressure for the zero degree angle from zero lift. One other data point or more at any higher angle from zero lift is obtained, and the relationship between the coefficient of pressure and angle from zero lift is defined for a specific airfoil configuration. The angle from zero lift system instrument's processor uses various acceptable mathematical functions to connect the points recorded in non-volatile memory providing the angular deviation from angle of zero lift for any coefficient of pressure resulting from any combination of pressures at the pressure ports for a known airfoil configuration.

An object of the invention is to provide an angular deviation from angle of zero lift measurement system for air vehicles using sensed pressures, and a display of angles from zero lift information on a display in the cockpit of the air vehicle. Another object of the invention is to eliminate the requirement for specialized probes and bulky sensors thus reducing weight, drag, complexity and cost. Another object of the invention is to provide a system that will produce angular deviation from angle of zero lift data on any air machine without the installation and calibration requirements for aligning a probe or port relative to a plane of the air vehicle. Another object of the invention is to provide angular deviation from angle of zero lift information to the air vehicle pilot and warnings when the angular deviation from angle of zero lift is at critical angles such as warnings when the angle from zero lift is approaching an unsafe angle from zero lift where the airflow will separate from the airfoil. Another object of the invention is to provide a visual indication of when the airfoil is operating at the optimum angular deviation from angle of zero lift for an approach, or for the best lift over drag or other optimum performance parameters based on AOA. Another object of the invention is to warn a pilot when the air vehicle's airfoil is not properly configured for an approach to landing and the pilot intends to land.

Another object of the present invention is to eliminate the need to de-ice or anti-ice the probe or vane used on other AOA devices. Still another object is to eliminate or reduce the radar profile and/or the heat profile. These objects are accomplished by the present invention due to the nonobtrusive ports and their flush location relative to the a wing surface which requires no de-icing or anti-ice treatment.

An advantage of the present invention is that it may be used to create and develop coefficient of pressure data points based on a wind tunnel or other simulation situation, or by using CFD (computational airfoil data analysis). Additional advantages of the present invention are that the apparatus is light in weight and easy to install, it does not require the use of ugly, protruding probes, it does not require precise alignment of probes, it does not require moving parts, it can be adapted to virtually any aircraft, including drones, remote piloted vehicles (RPV's) and the like, and its operation and use is easy to understand and learn.

Other features and advantages of the apparatus and method of the present invention will become more fully apparent and understood with reference to the following description and drawings, and the appended claims.

BRIEF DESCRIPTION OF THE DRAWINGS

FIG. 1 is a fragmentary elevational view of a portion of an air vehicle depicting two pressure detecting orifices located on the airfoil thereof.

FIG. 2 is an enlarged central cross-sectional view depicting one embodiment of a pressure port attached to an airfoil lower interior surface.

FIG. 3 is an enlarged central cross-sectional view depicting one embodiment of a pressure port and air water separator attached to an airfoil upper interior surface.

FIG. 4 is block diagram depicting one embodiment of the process used to collect the air pressures, compute the coefficient of pressures, store the coefficient of pressures in non-volatile memory, and output angles from zero lift.

FIG. 5 is a block diagram depicting electronic instrumentation used in one embodiment of the invention to compute the coefficient of pressure and the angular deviation from angle of zero lift.

FIG. 7 is a substantially representational view depicting the installation of one embodiment of the present invention.

FIGS. 9a and b depicts one embodiment of an optional display indicator for use in the present invention.

DETAILED DESCRIPTION OF PREFERRED EMBODIMENTS

Figures 11, 11A:
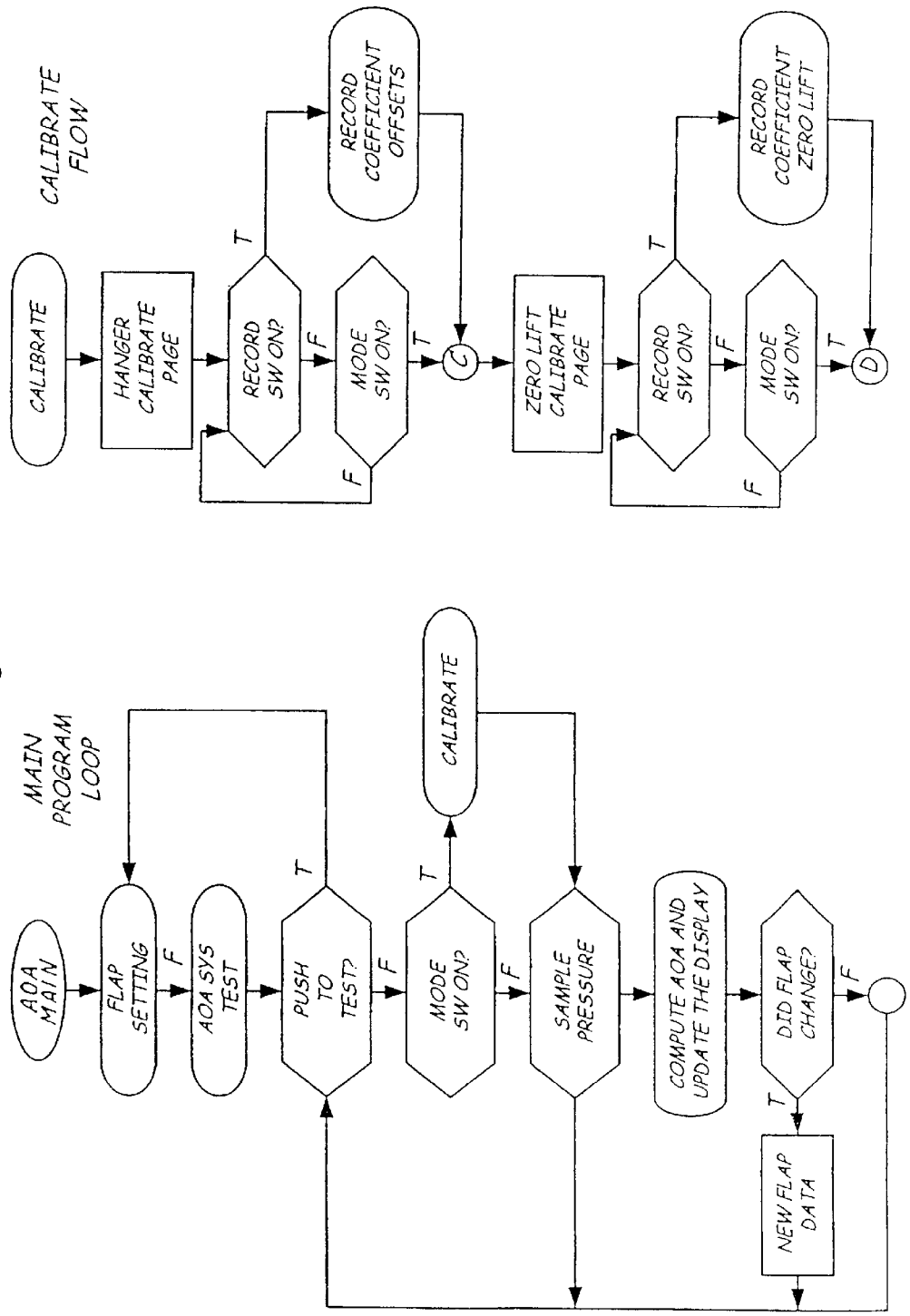
FIG. 11, including
FIG. 11a and FIG. 11b, depicts one embodiment of a program or operational flow of one embodiment of the present invention.
Figure 11:
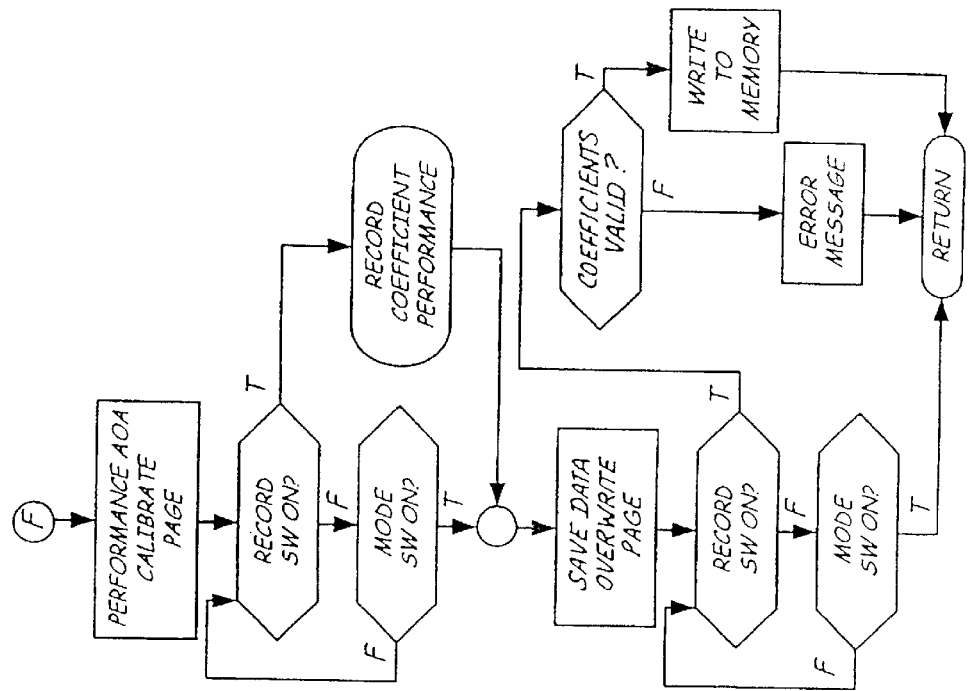
Figure 11B:
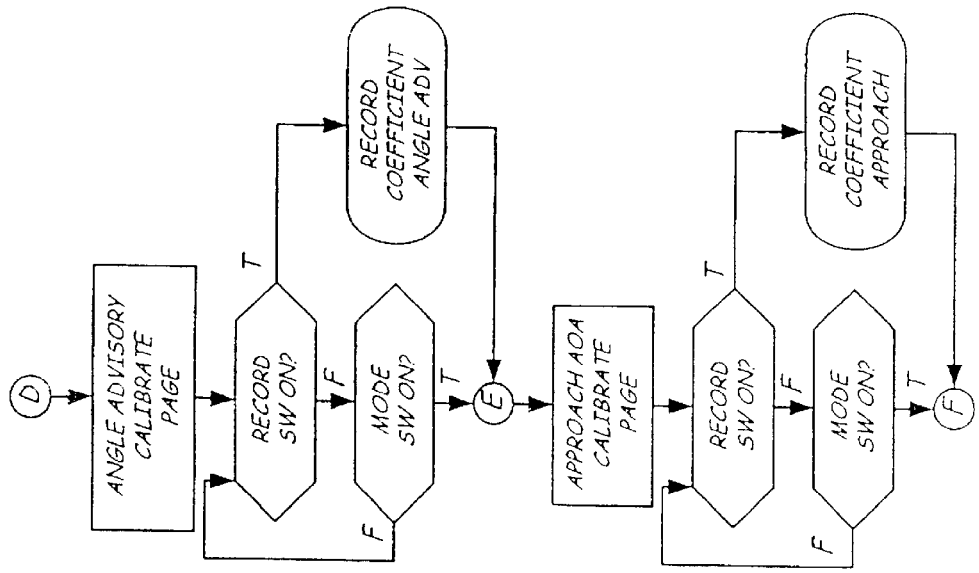

The accompanying Figures and Appendices A and B depict and describe embodiments of the apparatus or system of the present invention, and features and components thereof, and set forth steps in the method of the present invention (see particularly FIG. 11, with respect to one exemplary embodiment). With regard to means for fastening, mounting, attaching or connecting the components of the present invention to form the apparatus as a whole, unless specifically described otherwise, such means are intended to encompass conventional fasteners such as machine screws, machine threads, snap rings, hose clamps such as screw clamps and the like, rivets, nuts and bolts, toggles, pins and the like. Components may also be connected adhesively, by friction fitting, or by welding or deformation, if appropriate. Electrical functions may be provided by available or typical electrical components, including chip or board components. Connections may be soldered or potted, and wire, cable, wireless, optical fiber or other connections and junctions and electrical components may be used. Unless specifically otherwise disclosed or taught, materials for making components of the present invention are selected from appropriate materials such as metal, metallic alloys, natural or synthetic fibers, plastics and the like, and appropriate manufacturing or production methods including casting, extruding, molding and machining may be used.

Any references to front and back, right and left, top and bottom, upper and lower, and horizontal and vertical are intended for convenience of description, not to limit the present invention or its components to any one positional or spacial orientation.

Referring then to the Figures, FIG. 1 illustrates an airfoil 14 as is typically used on air vehicles, including aircraft such as airplanes, jets and the like (not shown). The depicted airfoil is intended to airfoils for use on any vehicle having an airfoil or structure which creates lift. In the instance of fixed wing aircraft, a high lift device 16 is typically attached to the airfoil (FIG. 1 shows a flap 16 movable to selected positions, including the position shown in phantom), and other high lift devices (not shown, but well known to those skilled in the art) may also be attached to the airfoil 14 such as leading edge flaps. Such high lift or lift varying devices may significantly change the shape and aerodynamic characteristics of the airfoil 14. A proximity position sensor 18 is attached either directly to the high lift device 16 or to the mechanism that moves the high lift device 16 to indicate its position. The airfoil 14 consists of an interior compartment 20 at least part of which is generally free of structure.

In accordance with one embodiment of the present invention, one or more orifices 22, 24 are located on and extend through the airfoil exterior surface 26 and provide communication of pressure or pressures from the exterior to the compartment 20. The upper orifice 22 communicates pressures from or adjacent to the upper airfoil surface 30 and is located along the upper surface 30 of the airfoil 14 where the local pressure varies with angles from zero lift. More than one upper orifice may be provided, as indicated by phantom rear upper orifice 22'. In this instance the orifices may be operably coupled or bussed together. There will be many locations where the local pressures vary uniquely with angles from zero lift along the airfoil surface 30 and the positional and dimensional relationships shown in FIG. 1 are intended to be representative of any such location. For example, generally front and rear orifices 22 and 22' could be used on the upper surface 30 of the airfoil 14.

The upper orifice 22 communicates to the interior of an air water separator 34. The interior of the air water separator 34 communicates to the barbed hose adapter 36 which is secured to the side of the air water separator 34 and sealed with a typical washer or like sealing means. The barbed hose adapter 36 communicates to a flexible tube or hose 38. The flexible hose 38 communicates to a suitable pressure sensor or the like located in or adjacent to the angle from zero lift computer (not shown literally, but see FIG. 4 for a representation thereof). A quick drain 40 is fastened to the bottom of the air water separator 34 and is accessible through a hole or grommet 42 in the bottom surface 46 of the airfoil 14. The quick drain 40 allows water to be drained from the air water separator 34 by overcoming spring pressure by pressing on the flange or grommet 42 in an upward direction and is normally sealed when the spring pressure is not overcome. A threaded plug (not shown) would also serve a similar purpose. The air water separator 34 may be selected and/or constructed depending upon the wing construction type.

Referring to FIG. 3, for composite wing structures, an upper air water separator tube 48 slides within the lower tube 50 of the air water separator allowing the length of the air water separator to be adjusted to the thickness of the airfoil. Structural adhesive may be used to bond and seal the structural ring 52 to the inside of the upper airfoil surface, to bond and seal the upper tube to the ring and bond and seal the lower tube 50 to the upper tube 48.

Typical installation of the upper air water separator tube 48 may be outlined as follows. The air/water separator is installed under the upper wing pressure port and is designed to prevent water or debris that enters the upper wing port from getting into the tubing leading to a transducer or microprocessor (as explained below). The air/water separator is drainable through the bottom skin of the wing. The purpose of the telescoping air/water separator shown is to simplify installations, especially retrofits, and to prevent having to bore a 1" OD installation hole in the bottom skin of the wing, but other air/water separator or drains may be used as well. First, gain access to the inner wing where the air/water separator is to be installed. This may be done by removing the wing tip, or through an access panel. Sometimes access can be gained through the nav light lens. Plan the installation so that the air/water separator is normal (perpendicular) to the bottom skin of the wing and meets the upper wing skin at the targeted % chord. The brass barb should be oriented near the top wing skin. It is recommended that the inner wing skin bid and core be removed if possible subject to structural considerations. Due to variables with the manufacture of the phenolic tubes, it may be necessary to sand the outer diameter of the smaller inner phenolic tube until it easily slides within the larger phenolic tube. This can be done by hand or on a grinder. Insert the inner tube within the larger phenolic tube. Bevel the smaller diameter tube so that it is flush with the upper wing skin and the brass barb is oriented the proper direction for easy removal and installation. The larger tube should not be beveled because it is perpendicular to the bottom wing skin. The tubes should be trimmed to the proper length. Allow enough length in the larger diameter phenolic tube for the aluminum donut to slide far enough into it without contacting the smaller phenolic tube for a flush installation. It may be a good idea to orient the hose barb so that it can be removed or replaced. Test fit the installation by elongating the telescoping air/water separator into the area where the core was removed. If the fit is good, use epoxy flox or the equivalent and bond into position and seal the area where the two tubes meet. Drill through the bottom skin of the wing into the center of the phenolic tube. Enlarge the opening to the inner diameter of the air/water separator. Drill through the upper skin using a #60 drill bit (0.040") into the center of the air/water separator. The hole should be drilled normal (perpendicular) to the wing skin. Remove any burs caused by the drilling process. The upper wing skin in the area of the hole should not be excessively thick (probably not more than $\frac{1}{8}$"). If necessary, accessing through the bottom of the air/water separator, use a $\frac{1}{4}$" or larger long drill bit to remove any excess thickness in the upper wing skin just under the pressure port, being careful not to drill all the way through the upper wing skin. Install the drain assembly into the AL donut using Teflon tape or equivalent as a thread sealer. If it will not screw into the donut from one direction try the other. Sand the outer diameter of the aluminum donut until it snugly fits within the phenolic air/water separator. Do a test fit insuring the assembly will slide far enough up into the air/water separator so that the drain is flush with the bottom wing skin. Use epoxy or structural adhesive to bond the AL donut into the air/water separator. The push to drain assembly should be flush with the bottom skin of the wing. Pressure test the entire assembly using soapy water and fix any leaks. Referring to FIG. 7, for aluminum or fabric wing structures 56 an upper air water separator block 58 is bonded to the interior of the upper wing skin and connects to a flexible tube 60 which connects to a lower block 62 attached to the lower interior wing skin.

Referring to FIG. 2, the lower orifice 24, which communicates pressures from the lower surface or underside 66 of an airfoil 14, is located along the lower surface 66 of the airfoil where the local pressures vary uniquely with angle from zero lift. As in the instance of the upper surface 30 of an airfoil, there will be many locations where the local pressure varies uniquely with angle from zero lift and the positions and dimensions depicted in FIG. 2 are not intended to be exclusive. The lower orifice 24 communicates to a barbed hose adapter 68, in turn coupled to or communicating with a flexible hose 70. The flexible hose 70 communicates to a pressure sensor located in the angle from zero lift computer (not shown, but see FIG. 4 for a representation). Structural adhesive is used to seal and bond the structural ring 72 to the inside of the lower airfoil surface. The barb 68 is fastened to the ring 72.

Pressures from the pitot and static system (ports, probes or the like not shown, but typical and well-known to those skilled in the art) may be communicated to the angle from zero lift computer via pressure tubes of suitable size that are tied into the air vehicle pitot and static system or from the air vehicle pitot tube and static port. Any suitable method to accomplish this would be acceptable.

The airfoil pressures from the upper and/or lower orifice or orifices are connected to a pressure sensor or sensors 80 located in or adjacent to the angle from zero lift computer 82 as illustrated in FIGS. 5 and 7. The pitot and static pressures are also connected to a pressure sensor or sensors 80 as illustrated in FIGS. 5 and 7. Referring to FIG. 5, the pressure sensors 80 output a voltage which is communicated to an analog to digital converter 84. The analog to digital converter 84 communicates digital data electronically to a microprocessor 86. It should be noted that the pressure sensor(s) 80 and the analog to digital converter 84 may be located immediately adjacent to or remote from the angle from zero lift computer 82.

The high lift device proximity sensor 18 communicates electrically the position of the high lift device 16 to a microprocessor 86 located within the angle from zero lift computer 82. Three momentary push switches 88, 90, 92 communicate with the microprocessor electrically. The mode switch 88 is used to select the calibrate function of the angle from zero lift system and is used to select one of several modes as will be explained herein below. The record switch 90 is used to record data in the EEPROM which stores data and is non-volatile. The test switch 92 is used to put the angle from zero lift system into a test mode.

An electrical port 94, which may be described as an open collector sink, is connected to a power transistor 96 which is connected to the microprocessor 86 and may be used as a current sink to activate external electrical devices when the airfoil's angle from zero lift is approaching an unsafe angle from zero lift where the airflow will separate from the airfoil.

A voice playback system, including, for example, chip 100 may be connected to the microprocessor 86 and may be amplified 102 and available on the output pins of the angle from zero lift computer 82 in a high and low impedance conforming to air vehicle impedance standards. The voice playback system enunciates verbally when the angular deviation from angle of zero lift is approaching an unsafe angle from zero lift where the airflow will separate from the airfoil, and enunciates verbally when system errors have been detected.

A tone playback system may be connected to the microprocessor, and may be amplified and available on the output pins of the angle from zero lift computer 82. The tone system plays a middle "C" tone as a reference tone during approaches to landing. Another tone is played over the middle "C" tone and is bent from a middle "C" in either direction depending upon the relative angle from zero lift at the optimum angle from zero lift for approaches to landing. The reference and bent middle "C" tones used in this application are not limiting as other tones other than "C" would work as well.

An electrical communications port 106 may be available on the output pins of the angle from zero lift computer 82. This port 106 may be used to export angular deviation from angle of zero lift related data to other devices having compatible communications ports. Other communication standards are available and the exemplary port 106 (an RS-232 port) used in this embodiment is not limiting.

As shown in FIG. 5, a EEPROM 110 is a part of the angle from zero lift computer 82. The EEPROM 110 electrically communicates with the microprocessor 86 and is used to permanently store digital data relating to the flight calibration processes.

Figure 6:
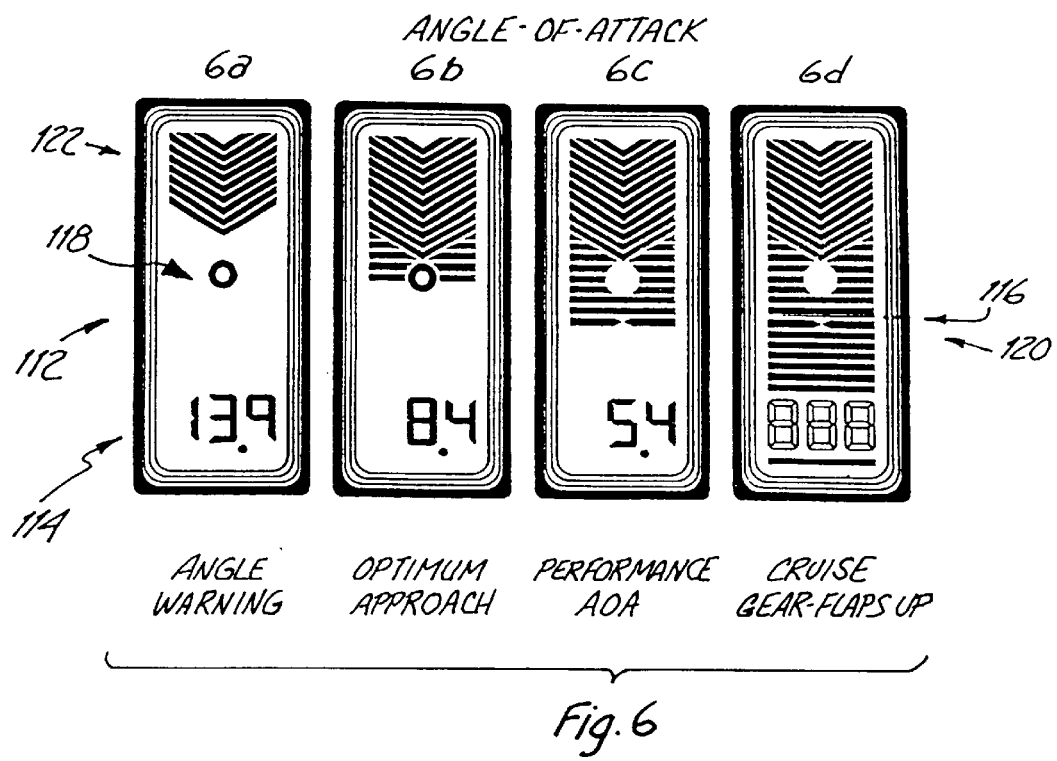
FIGS. 6a–d depicts a front view of one embodiment of an angle from zero lift indicator which visibly displays the angular deviation from angle of zero lift in an analog bar display and a digital display of the actual angle in units.
Figure 10:
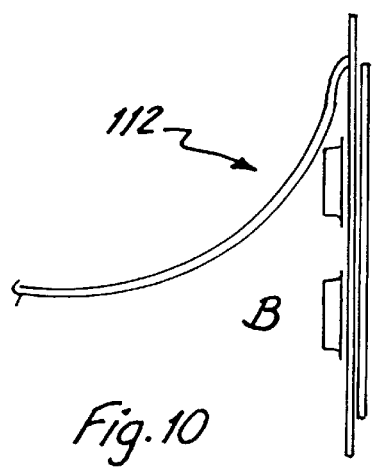
FIG. 10 depicts one embodiment of a liquid crystal display indicator for use in the present invention.
Figure 8:
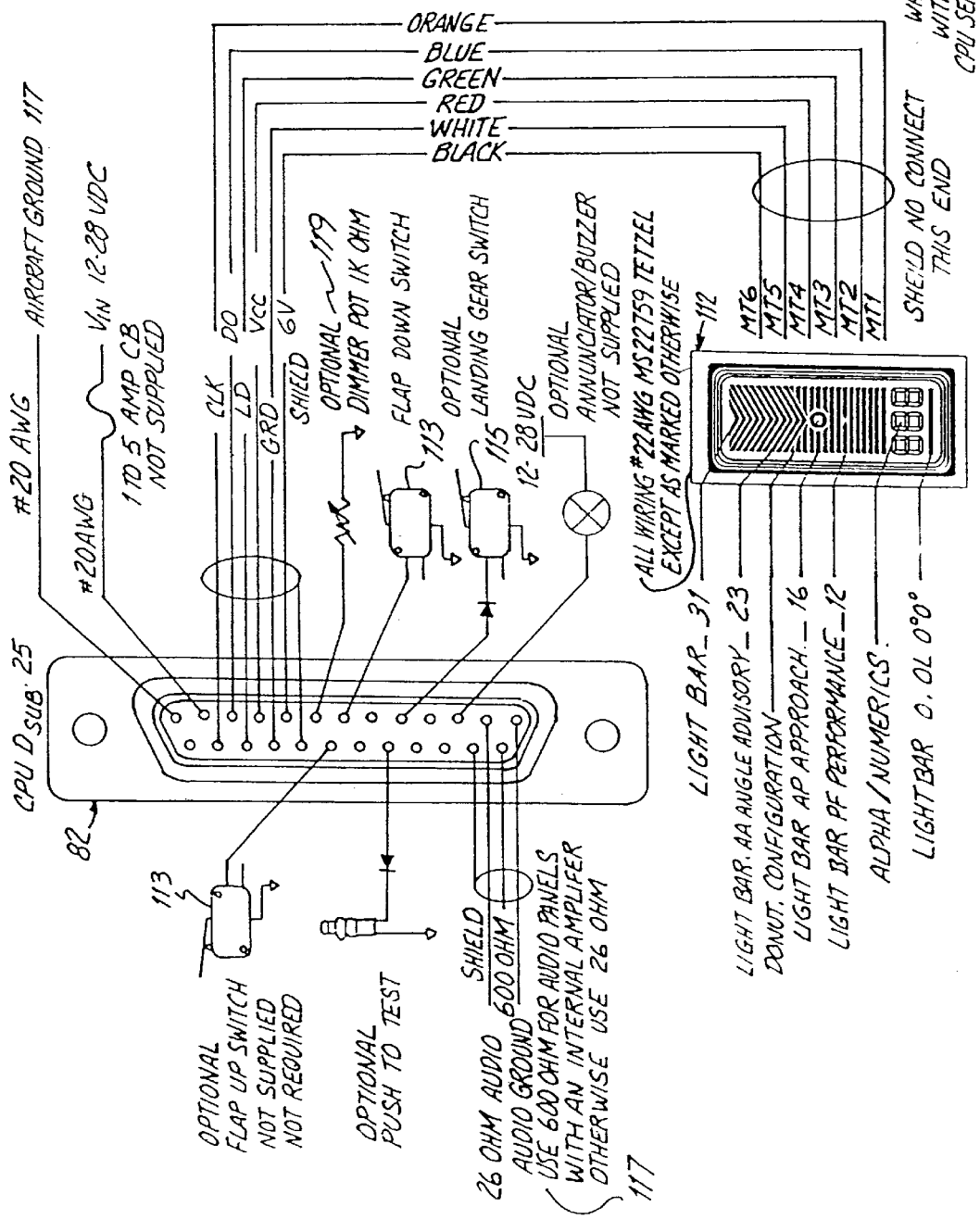
FIG. 8 is a substantially representational view depicting one embodiment of components of the present invention, including the display, outputs thereto and optional inputs and controls.

The angle from zero lift indicator 112 depicted in FIGS. 6 and 10 preferably is a dash or console mounted liquid crystal display device 112 and, as shown in FIG. 8, electrically communicates with the microprocessor 86. Note that FIG. 8 also depicts optional inputs, outputs and controls, such as flap switches 113, landing gear switch 115 and grounds 117. The indicator 112 has a digital numeric display 114 at the bottom of the display controlled by the microprocessor 86 and consisting of three digits with seven segments each that indicates angles from zero lift in units of angular deviation from angle of zero lift. The indicator has 27 colored bars 116 each individually controlled by the microprocessor 86 that are either turned on or off and provide a pilot with an analog type display of the angular deviation from angle of zero lift relative to zero lift. The indicator has a green donut shaped segment 118 in the center of the display that when turned on indicates that the airfoil 14 is configured for an approach to landing. The display 112 has a green split segment 120 several bars below the donut 118 that indicates the angular deviation from angle of zero lift where the airfoil is at a performance angular deviation from angle of zero lift, for example, at the best lift over drag angular deviation from angle of zero lift or the maximum endurance angular deviation from angle of zero lift. The chevron shaped segments 122 at the top of the indicator are red and indicate an angular deviation from angle of zero lift that is close to where the air may separate from the airfoil. A verbal warning message enunciates continually when the indicator displays an angular deviation from angle of zero lift in the red chevrons (FIG. 6a). The optimum angular deviation from angle of zero lift for an approach to landing is displayed when the yellow segments and red chevrons are turned on abeam and above the donut (FIG. 6b). The optimum performance angular deviation from angle of zero lift is displayed when the green segments, yellow segments, and red chevrons at and above the split green segment are turned on (FIG. 6c). The white segment under the digital display, all the green segments, all the yellow segments and all the red segments are turned on when the airfoil is at zero degrees from zero lift (FIG. 6d). The colors, number, and specific arrangement of the segments on the display described above are preferred, but others may be used as well.

An alternative display 140 as shown in FIGS. 9a and b comprises eight colored light emitting diodes. The top four diodes 142 are red in color, the middle three diodes 144 are amber in color and the bottom diode 146 is green. The light emitting diodes are arranged in a row and may be called a LED ladder. FIG. 9b depicts a typical assembly wherein a bezel 143 houses the diodes which are held in place by a suitable edge connector 145. At high angles from zero lift where the airfoil is close to the critical angle one or more of the red LED's and all the other LED's are illuminated. At the optimum angle from zero lift for an approach the middle amber colored LED and all LED's below are illuminated. As the angle from zero lift increases from zero angle the LED ladder illuminates from the bottom green up the ladder to the red LED's.

Either of the two display embodiments and other alternative embodiments may be dimmable, in part or as a whole, by using a dimmer potentiometer (not shown) which controls a voltage regulator (not shown) to adjust the current through, for example, the display backlight bulbs. Preferably, a wide range of brightness will be available. Dimming of the eight bulb ladder LED display 142 would be accomplished, for example, by pushing a dimmer button or switch (not shown) which may either affect the display continuously giving a selectable level of brightness, or drop it to a preselected night viewing level of brightness. See FIG. 8 for coupling of the optional dimmer 119.

The apparatus of the present invention may be adapted to assess and process wing-tip pressure measurements. No matter where they are, one or more of the pressure ports or pressure sensing openings, e.g., ports 22, 24, may be adapted to include an electronic device at the orifice, e.g., a pressure transducer, an analog to digital converter and/or conditioner (not shown, but well-known to those skilled in the art). In this instance, the digital equivalent of sensed pressure would be communicated to the processor 82. The present invention may be adapted to provide additional information to a pilot, such as a landing gear warning signal (see FIG. 8). The present invention may be built-in in new aircraft or it may be retrofit in existing aircraft. Wing and/or pressure ports or openings and optional air/water separators, if required, may be installed through the wing tip or in areas accessible through existing access panels. The ports are typically and approximately the diameter of a common paper clip and are located at 10% chord or aft. For the routing of pressure tubes from the wing pressure ports to the cabin area, appropriate bulkhead and other fittings and/or junctions may be used. The CPU 82 selected for use with the present invention may be located behind the instrument panel or anywhere in the aircraft or cabin. The display instrument may be panel or glare shield mounted. Appendix B is provided to give an example of components, and specifications thereof, for a typical commercially available embodiment of the apparatus of the present invention, and Appendix A provides the manufacturer and model number of some of the components.

OPERATION

While the operation of the angle from zero lift measuring and displaying system will be readily apparent to those skilled in the art, the following discussion of the operation of one embodiment of the present invention will be presented for convenience and understanding.

Referring FIG. 4, the pressure at two orifices on the airfoil, block 150, are communicated to a temperature compensated differential pressure transducer, block 152. Two additional pressures from the pitot and static systems, block 154, installed on all air vehicles are also communicated to a temperature compensated differential pressure transducer 156.

The pressure transducer electrical outputs are conditioned and digitized and communicated to a processor 158 where the below described calculations are performed. The differential pressure transducer has a unique error called the zero pressure offset, it does not necessarily output exactly 0 volts at zero p.s.i. The digital differential pressure from each pressure transducer is adjusted to compensate for each zero pressure offset using data recorded in the EEPROM by subtracting the EEPROM data from the saved pressure data.

$$P_{ADJ}=P_X-P_XHC$$

The data in the EEPROM resulted from taking a reading in the system's hangar calibration mode while the airfoil was in a hangar or the like where the air is not in motion relative to the pressure ports.

The aircraft (i.e., the airfoil) is then flown into the air and a zero G maneuver is accomplished (or this may be simulated) which indicates where no lift, either positive or negative, is being generated by the aircraft. The systems computer is put into the zero lift mode using the mode switch and the sensed pressures are saved in the microprocessor 82 at the appropriate time using the record switch. In the case of using differential pressure transducers, the pressures from the differential pressure transducers are adjusted for the zero offsets and saved in the microprocessor 82. A coefficient of pressure is calculated using all four pressures where:

$$CP=(P_{W1}-P_{W2})/(P_P-P_S)$$

The coefficient of pressure is communicated from the microprocessor to the EEPROM. The EEPROM saves the coefficient of pressure in non-volatile memory.

The airfoil is then flown into the air (or this situation is simulated) and an angle from zero lift is flown using the airspeed indicator as a reference where it is desirable that the angle advisory systems activate. The system computer is put into the angle advisory mode using the mode switch and the pressures saved at the appropriate time using the record switch. The pressures from the differential pressure transducers are adjusted for the zero offsets and saved in the microprocessor. A coefficient of pressure is calculated using all four pressures where:

$$CP=(P_{W1}-P_{W2})/(P_P-P_S)$$

The coefficient of pressure is communicated from the microprocessor to the EEPROM. The EEPROM saves the coefficient of pressure in non-volatile memory.

As indicated generally at block 160, the above-outlined operations provide two coefficient of pressure flight data points which, along with the hanger calibration, are sufficient for each airfoil configuration to build the relationship between the coefficient of pressure and angle from zero lift. It is well known by those skilled in the art that the coefficient of pressures vary uniquely with angles from zero lift and that as little as two data points could define all the points over the entire coefficient of pressure and angle from zero lift relationship.

Preferably, the angle from zero lift instrument display 112 displays not only the full range of angles from zero lift, as described herein above the display 112 also has special markings to indicate the optimum approach to landing angle from zero lift (donut) and the optimum performance angular deviation from angle of zero lift (split light bar) for each selected airfoil configuration. The display 112 is designed so that these special markings are located on the indicator so that their relative position to the angle advisory and angle from zero lift light bars are typical of most airfoils.

Should the approach angular deviation from angle of zero lift be required and the approach angle from zero lift is not in precise agreement with the display, another data point may be recorded to the EEPROM via calculations explained below, will force the display into exact agreement by flying at the desired angle for approach using the airspeed indicator as a reference. The systems computer is put into the approach advisory mode using the mode switch and the pressures recorded at the appropriate time using the record switch. The pressures from the differential pressure transducers are adjusted for the zero offsets and saved. A coefficient of pressure is calculated using all four pressures where:

$$CP=(P_{W1}-P_{W2})/(P_P-P_S)$$

The coefficient of pressure is communicated from the microprocessor to the EEPROM. The EEPROM saves the coefficient of pressure in non-volatile memory.

Should the performance angular deviation from angle of zero lift be required and the performance angle from zero lift is not in precise agreement with the display, another data point may be recorded to the EEPROM, which via calculations (explained herein below) will force the display into exact agreement by flying at the desired angle for performance using the airspeed indicator as a reference. The systems computer is put into the performance advisory mode using the mode switch and the pressures recorded at the appropriate time using the record switch. The pressures from the differential pressure transducers are adjusted for the zero offsets and saved. A coefficient of pressure is calculated using all four pressures where:

$$CP=(P_{W1}-P_{W2})/(P_P-P_S)$$

The coefficient of pressure is communicated from the microprocessor to the EEPROM. The EEPROM saves the coefficient of pressure in non-volatile memory.

Having saved the hangar calibration zero offset in the EEPROM, the zero degree angle from zero lift in the EEPROM, and the advisory angle from zero lift in the EEPROM, there is enough data points to fully describe the relationship between the coefficient of pressures and the angles from zero lift. There may be two additional optional data points stored in the EEPROM for the current airfoil configuration under consideration. The microprocessor sensing a specific airfoil configuration uses the appropriate data points stored in the EEPROM and computes AOA using acceptable mathematical techniques to connect the data and extending beyond the data points.

The flight mode is the normal operating mode for the system. In the flight mode, the airfoil is then flown at any angular deviation from angle of zero lift into the air. The pressures from the differential pressure transducers are adjusted for the zero offsets and saved in the microprocessor 82. A coefficient of pressure is calculated using all four pressures where:

$$CP=(P_{W1}-P_{W2})/(P_P-P_S)$$

The coefficient of pressure is used to calculate the angular deviation from angle of zero lift, block 161. At block 162, the angular deviation from angle of zero lift is displayed on the angle from zero lift instrument and communicated to the data port. Should the angular deviation from angle of zero lift exceed the advisory angular deviation from angle of zero lift, an aural warning sounds repeatedly and the open collector sinks to ground. The system while in the flight mode continually loops through the aforementioned flight mode process continually updating the angle from zero lift display and the data port.

Preferred calibrating of the instrument involves recording the results for two airfoil configurations, one configuration for the high speed cruise configuration and one configuration for the approach to landing configuration. On some airfoils, there is the option to select many different configurations in-between the cruise and the approach to landing configuration. In this event, there exists an option for those in-between configurations to assume that one known configuration will produce a more conservative display than the other configuration. This assumption is set either in software directly or by physically setting an assumption jumper switch located on the systems computer. For those in-between configurations, the assumption jumper will communicate to the microprocessor the assumption desired, either to use the cruise or the approach to landing EEPROM data to compute the AOA for the in-between airfoil configuration selected. The system does however allow more than two airfoil configurations if opted with the ability to estimate the angular deviation from angle of zero lift using known coefficients of pressures for a multitude of airfoil configurations and the saved EEPROM data points for two or more airfoil configurations.

For additional information and details regarding the operation and software program flow of the present invention, the reader is referred to FIG. 11, outlining in block summary form the program flow of one embodiment of the invention.

The system and method of the present invention may be adapted to include an automatic self-test upon power up. Also, if desired, the instrument may be adapted for testing at any time by providing a test sequence activating button or switch and appropriate hardware and software.

The present invention may be embodied in other specific forms and steps without departing from the essential spirit or attributes thereof. It is desired that the embodiments described herein be considered in all respects as illustrative, not restrictive, and that reference be made to the appended claims for determining the scope of the invention.

For example, as set forth herein above, in one embodiment, the present invention relates to a measurement, data manipulation and information display system and method for use on air vehicles and comprises a method of determining information for an air vehicle comprising the steps of providing a first coefficient of pressure data point, providing a situation involving the air vehicle, deriving pressures during the situation and deriving a second coefficient of pressure data point from the pressures derived during the situation, and defining a line passing through the first and second coefficient of pressure data points, whereby a selected coefficient of pressure data point on the line corresponds to the information. As set forth herein above, the data points may comprise coefficient of pressure data, and the information is related to aircraft performance or flight information, for example, information relating to angles from zero lift. Thus, in one embodiment, the present invention comprises a method of determining information for an aircraft comprising the steps of providing first input data, providing second input data, and processing the first input data and said second input data according to a predetermined set of instructions to determine a third data point, wherein the third data point correlates to the information. In some embodiments, providing the second input data comprises flying the aircraft, and in some embodiments, providing the first input data is selected from the group comprising flying the aircraft, simulating the flying of the aircraft or assuming the first input data. The information may comprise aircraft information, such as flight information, including, but not limited to flight characteristics, performance, angle of attack, lift, yaw and the like. The method, including the processing, may be carried out by a microprocessor.

In another illustrative embodiment, the system and method of the present invention relates to a measurement, data manipulation and information display system and method for use on air vehicles and comprises or may involve information relating to angles from zero yaw. (As used herein, the term "yaw" is intended to have its common meaning, as concerning aircraft, airplanes, spacecraft or projectiles, i.e., to turn by angular motion about the vertical axis.) In this embodiment, the system invented involves determining information for an air vehicle comprising the steps of providing a first coefficient of pressure data point, providing a situation involving the air vehicle, deriving pressures during the situation and deriving a second coefficient of pressure data point from the pressures derived during the situation, and defining a line passing through the first and second coefficient of pressure data points, whereby a selected coefficient of pressure data point on the line corresponds to the information. In this embodiment, the information may relate to angles from zero yaw, and the method may comprise the steps of creating a zero yaw situation, deriving pressures from the zero yaw situation, and deriving a first coefficient of pressure data point from the pressures derived during the zero yaw situation, creating a yaw producing situation, deriving pressures during the yaw producing situation and deriving a second coefficient of pressure data point from the pressures derived during the yaw producing situation, and defining a line passing through the first and second coefficient of pressure data points, whereby a selected coefficient of pressure data point on the line corresponds to an angle of attack. In this embodiment the method further comprises a sensor or sensors appropriately located on an air foil of an air vehicle. It should be appreciated that the accompanying Figures depict and diagram apparatus and method for use in measurement, data manipulation and information display systems and methods for use on air vehicles, for example, for lift and/or yaw. Thus, what is referred to as the "lift computer" (represented in FIG. 4) may also be referred to as simply the "computer" or "processor" or the "lift and/or yaw computer." Further, it may be used to process, manipulate, record and output aircraft information other than lift or yaw information.

It should be appreciated that one embodiment of the present invention, whether concerning lift, yaw or another type of aircraft information, comprises a method of determining information for an aircraft comprising the steps of providing first input data, providing second input data, and processing the first input data and said second input data according to a predetermined set of instructions to determine a third data point, wherein the third data point correlates to the information. In some embodiments, providing the second input data comprises flying the aircraft, and in some embodiments, providing the first input data is selected from the group comprising flying the aircraft, simulating the flying of the aircraft or assuming the first input data. The information may comprise aircraft information, such as flight information, including, but not limited to flight characteristics, performance, angle of attack, lift, yaw and the like. The method, including the processing, may be carried out by a microprocessor.

In one embodiment, the apparatus of the present invention is provided for measuring and displaying angular deviation from an angle of zero lift or yaw for air vehicles with an air foil and comprises an air foil pressure sensor on a surface of an air foil for sensing a local air foil pressure, a micro processor operably coupled to the air foil pressure sensor for receiving and processing sensed pressures, for deriving a coefficient of pressure, and for relating said coefficient of pressure to an angular deviation from angle of zero lift or yaw. The apparatus may further comprise an electrical indicator operably coupled to the micro processor for communicating information about the angular deviation. It may further comprise coupling the microprocessor to a pitot and/or static pressure sensors associated with or carried by the air vehicle.

As set forth herein above, the present invention may be used to create and develop coefficient of pressure data points based on simulation situations, or by using computational air foil data analysis. In other words, the zero lift or yaw situation may be an actual situation involving the aircraft, a situation involving the aircraft which simulates an actual situation (e.g., a wind tunnel situation) or it may be an assumed, hypothesized or otherwise created situation. Thus, for some types of aircraft, the zero G maneuver may not be performed and the coefficient of lift and/or yaw may be assumed to be zero, making the calibration process even easier. At least one other data point or more at any higher angle from zero lift and/or yaw is obtained, and the relationship between the coefficient of pressure and angle from zero lift or yaw is defined for a specific aircraft configuration. The angle from zero lift or yaw system instrument's processor uses various acceptable mathematical functions to connect the points recorded in non-volatile memory providing the angular deviation from angle of zero lift or yaw for any coefficient of pressure resulting from any combination of pressures at the pressure ports for a known aircraft and/or airfoil configuration. For in-between configurations, one or more suitable methods of interpolation may be used to compute angle from zero lift or yaw. Thus, the method and apparatus of the present invention may take into account, be adapted to, or otherwise be compatible with various aircraft and/or airfoils in which the configuration of the airfoil may be varied, for example, by using high lift devices. For a selected airfoil or aircraft configuration, a second, third or n sets of calibration data may be used.

A problem addressed by the present invention, in addition to those mentioned herein above, is that probes of the type mentioned in the above "Background" section must be located well ahead of the wing to reduce the effect of changes in lift and configuration. Usually the probe is located on or near the nose of an aircraft. This is a problem since many factors can affect the relationship between the local AOA and the true wing AOA. The airflow around the nose is not the same as that at the wing. Pitch rate errors occur when the nose of an aircraft is pitched up or down causing the probe to indicate too high or too low. In a turn, for example, the nose is pitched up reducing the local flow angle and causing the AOA reading to be too low. Because of the shape of the nose, sensitivity errors are introduced. A one degree change in true wing AOA may cause the local flow angle at the nose to be 1.5 to 2 degrees. In some embodiments, the present invention reduces or eliminates pitching, sensitivity and other errors common to traditional probe-based sensing devices.

Another problem with systems such as those noted above is that they do not account for varying aircraft configurations such as wing high lift devices (e.g., flaps and slats) being extended or retracted. The present invention does and, for various aircraft configuration, a second or third set of calibration data points may be provided. Once the data points are stored in the system memory, all other coefficient of pressures can be equated to a specific angular deviation from angle of zero lift or yaw for a specific, selected aircraft configuration. Thus, in one embodiment, the present invention provides an apparatus and method for use on aircraft and includes pressure sensors, an aircraft configuration sensor, a processor, at least one data port for electrically exporting angles from zero lift and/or yaw, and an indicator for visibly displaying angles from zero lift and or yaw.

In some embodiments, the present invention may sense, process and/or provide information relating to an airfoil approaching an unsafe angle from zero lift or yaw at which the airflow may separate from the airfoil or at which structural damage may occur.

In one embodiment, the present invention relates to a measurement and display system for use on air vehicles having an indicator visibly displaying angles from zero yaw and having a data port for electrically exporting angles from zero yaw. In one embodiment, pressures from upper and lower wing ports and pressures from typical pitot in static ports of air vehicle are converted to digital data and mathematically divided into one another. The result is a coefficient of pressure (CP) which varies uniquely with angles from zero yaw of the air vehicle. The angular deviation from angle of zero yaw display is designed for air vehicles and is located in the cockpit and displays angles from zero yaw on a digital display. The data port electrically exports angles from zero yaw to other electronic devices using a compatible communications port. It has been discovered that if the coefficient of pressure data point for zero degrees angular deviation from angle of zero yaw and a minimum of one other coefficient of pressure data point is stored permanently in the system's non-volatile memory, other angles from zero yaw can be determined given any coefficient of pressure. For any given airfoil, it has been discovered that a minimum of two or more coefficient of pressures will accurately define the relationship between the coefficient of pressure and the angular deviation from angle of zero yaw. Once the data points are stored in the system's non-volatile memory, all other coefficient of pressures can be equated to a specific angular deviation from angle of zero yaw. Thus, in one embodiment, the present invention provides an apparatus and method for measuring pressures, for deriving and storing in non-volatile memory two or more coefficient of pressure data points, and for exporting and displaying the angles from zero yaw.

In one embodiment of the present invention, a microprocessor may be used to permanently store the two or more coefficient of pressures which may be copied and installed in the angular deviation from angle of zero lift and/or yaw system of similar air vehicles of the same type to accurately display angles from zero lift and/or yaw.

It should be appreciated that the orifices 22, 24 (etc.) of the present invention may provide additional aircraft or airfoil information. For example, an abnormally low pressure reading or a falling pressure trend may indicate that an airfoil surface is becoming contaminated, e.g., by icing.

In one embodiment, particularly as to the display 140 depicted in FIGS. 9a and 9b, the diodes may comprise three red diodes, three amber diodes and two green diodes.

With respect to the operation of the present invention, it is as is described herein above, and whenever "lift" is referred to in the description, it should be appreciated that yaw may be referred to alternatively or conjunctively as well. That is, the present invention may be used to sense, assess, determine and/or predict aircraft information, including information related to flight characteristics such as lift or yaw, and it may do so selectively as to either lift or yaw or both. It should also be appreciated that, in some embodiments, coefficients of pressure may be calculated using three pressures (instead of four) where $$CP=(P_W-P_S)/(P_P-P_S)$$

where $P_W$ is either $P_{W1}$ or $P_{W2}$

Again, the present invention may be embodied in other specific forms and steps without departing from the essential spirit or attributes thereof. It is desired that the embodiments described herein be considered in all respects as illustrative, not restrictive, and that reference be made to the appended claims for determining the scope of the invention.

APPENDIX A

| Description | Manufacturer | Part # |
| --- | --- | --- |
| 5 psi differential pressure sensor | SenSym | SDX05D4-A |
| RS232 transmitter/receiver | Maxim | MAX232ACPE |
| 8 bit microprocessor −40 to +85 deg | Microchip | PIC16C65-A-20I/P |
| EPROM 8 bit × 128 | Microchip | 93LC46A-I/P |
| Triple 2 chan Mux | National Semi | CD4053BCN |
| crystal @ 8 MH | DigiKey | CTX-082 |
| A/D converter w/ serial interface | Newark | TLC1549CP |

APPENDIX A-continued

| Description | Manufacturer | Part # |
| --- | --- | --- |
| Voice playback chip | NuHorizons ISD | ISD1416PI |
| 4 color liquid crystal display | Crystalloid | AOA LCD |
| 32 segment LCD driver | Microchip | AYO438/L |
| steel drain valve | Stratoflex | 1/8NPT drain valve |

SPECIFICATIONS

Computer (CPU):
12 to 28 volts DC
0.5 ampere current draw maximum including backlight for display instrument
weight: 13 ounces including tray or cage
Auxiliary open collector max sinking 0.8 amps at 12–28 VDC
Display instrument (LCD):
weight: 2 ounces
backlight may be dimmable
four colors display
Pressure Sensors:
5 p.s.i. operating
20 p.s.i. burst
Voice Output:
600 ohm audio output
26 ohm audio output
adjustable volume control

APPENDIX B

One Typical Commercially Available Embodiment of the Present Invention

| | |
| --- | --- |
| AOA CPU | angle-of-attack central processing unit is enclosed in a metal tray |
| AOA LCD | angle-of-attack liquid crystal display is a four color display and backlit in a custom black anodized bezel |
| Dimmer with knob | dimmer to adjust the backlight of the display |
| Wiring Harness | customized to your specifications |
| Pressure tubing | color coded ⅛ inch OD tubing red, blue, green and clear |
| Air/Water Separator | either glass kit or aluminum kit supplied if needed |
| AOA Pressure Port decal | decal or stencil |
| Push to Test switch | momentary switch which when pushed starts the self test "AOA PASS" |
| Microswitch | flap position sensing |
| Nylon tees and adapters | two tees with adapters to ⅛" OD tubing for the pilot and static taps |
| Hose barbs & bulkhead fittings | enough to complete installation |
| SS recessed cap screws | for the LCD display panel mount |
| Manual | illustrated operating, installation and education manual in 3 ring binder |

What is claimed is:

1. A method for determining information for an air vehicle comprising the steps of:
    providing a first coefficient of pressure data point;
    providing a situation involving the air vehicle, deriving pressures during the situation and deriving a second coefficient of pressure data point from the pressures derived during the situation; and
    defining a line passing through the first and second coefficient of pressure data points, whereby a selected coefficient of pressure data point on the line corresponds to the information.

2. The method according to claim 1, wherein the information comprises flight information.

3. The method according to claim 1, wherein providing the first coefficient of pressure data point comprises assuming the first coefficient of pressure data point.

4. The method according to claim 2, wherein the flight information comprises angle from zero lift.

5. The method according to claim 2, wherein the flight information comprises angles from zero yaw.

6. The method according to claim 2, wherein the flight information relates to a selected air vehicle configuration.

7. The method according to claim 1, further comprising an additional data point, said data points defining a curvilinear relation between coefficients of pressure and the information.

8. A method of determining aircraft information for an air vehicle comprising the steps of:
creating a zero yaw situation, deriving pressures during the zero yaw situation, and deriving a first coefficient of pressure data point from the pressures derived during the zero yaw situation;
creating a yaw producing situation, deriving pressures during the yaw producing situation and deriving a second coefficient of pressure data point from the pressures derived during the yaw producing situation; and
defining a line passing through the first and second coefficient of pressure data points, whereby a selected coefficient of pressure data point on the line corresponds to the aircraft information.

9. The method according to claim 8, further comprising pressure sensors including an airfoil pressure sensor operably carried by an airfoil of the air vehicle, a pitot pressure sensor and a static pressure sensor.

10. The method according to claim 9, wherein deriving the first and second pressure data points comprises obtaining an airfoil differential pressure from the airfoil pressure sensor and dividing said airfoil differential pressure by a pitot static differential pressure obtained from the pitot and static pressure sensors.

11. A method of determining angular deviations from a zero yaw angle for an air vehicle including an airfoil comprising the steps of:
providing the air vehicle with pressure sensors operably linked to a microprocessor;
performing a zero yaw flight maneuver to provide the zero yaw angle and sensing pressures during the zero yaw flight maneuver;
using the microprocessor to derive a coefficient of pressure from the sensed pressures and recording said coefficient of pressure in the microprocessor;
acquiring a coefficient of pressure data point while the air vehicle is producing yaw, communicating the coefficient of pressure data point to the microprocessor to define a unique relationship between the coefficient of pressure; and
providing an angular deviation from the zero yaw angle for any coefficient of pressure.

12. The method according to claim 11, further comprising providing angular deviation information to a pilot of the air vehicle.

13. The method according to claim 12, further comprising providing warnings to the pilot when an angle from zero yaw is approaching an angle at which airflow separates from the airfoil.

14. An apparatus for measuring and displaying aircraft information for aircraft with an airfoil and with a pitot pressure sensor and a static pressure sensor comprising:
an airfoil pressure sensor on a surface of the airfoil for sensing a local airfoil pressure;
a microprocessor operably coupled to the pitot and static pressure sensors and to said airfoil pressure sensor for receiving and processing sensed pressures, for recording a first coefficient of pressure and a second coefficient of pressure, wherein the microprocessor processes and correlates said first and second coefficients of pressure to provide the aircraft information; and
an electrical indicator operably coupled to the microprocessor for communicating the information.

15. A method of determining information for an aircraft comprising the steps of:
providing first input data;
providing second input data; and
processing said first input data and said second input data according to a predetermined set of instructions to determine a third data point.

16. The method according to claim 15, wherein the third data point correlates to the information.

17. The method according to claim 15, wherein providing said second input data comprises flying the aircraft.

18. The method according to claim 15, wherein said providing said first input data is selected from the group comprising flying the aircraft, simulating the flying of the aircraft or assuming the first input data.

19. The method according to claim 15, wherein the information comprises flight information.

20. The method according to claim 15, wherein said processing is carried out by a microprocessor.

21. A method of calibrating an aircraft sensor for providing aircraft information, comprising:
providing a zero coefficient of pressure data point; and
providing an aircraft situation, obtaining a pressure reading during the aircraft situation and deriving a second coefficient of pressure data point from the pressure reading obtained during the aircraft situation.

22. The method according to claim 21, further comprising using the zero coefficient of pressure data point and the second coefficient of pressure data point to define a line, whereby a selected coefficient of pressure data point on the line corresponds to the aircraft information.

23. The method according to claim 22, wherein said providing a zero coefficient of pressure data point comprises creating a zero yaw situation and obtaining pressures during the zero yaw situation.

24. The method according to claim 22, wherein said providing a zero coefficient of pressure data point comprises creating a zero lift situation and obtaining pressures during the zero lift situation.

25. The method according to claim 21, wherein an aircraft carrying the aircraft sensor has a variable configuration.

26. The method according to claim 21, wherein an aircraft carrying the aircraft sensor has at least two configurations, and wherein the method may be performed at two selected configurations, the method further comprising interpolating for configurations other than said two selected configurations.

27. The method according to claim 26, wherein said two selected configurations comprise flap settings.

* * * * *